United States Patent
Goerling et al.

[11] 3,955,489
[45] May 11, 1976

[54] PROCESS FOR CONTINUOUSLY PRODUCING A ROASTED COCOA MASS AND FOR MANUFACTURING A CHOCOLATE MASS

[75] Inventors: Paul Martin Goerling; Klaus Paul Ernest Zuercher, both of Hannover, Germany

[73] Assignee: Nabisco, Inc., East Hanover, N.J.

[22] Filed: Mar. 21, 1975

[21] Appl. No.: 560,600

Related U.S. Application Data

[60] Division of Ser. No. 311,664, Dec. 4, 1972, Pat. No. 3,904,777, which is a continuation-in-part of Ser. No. 120,596, March 3, 1971, abandoned.

[30] Foreign Application Priority Data

July 21, 1970 Germany............................ 2036202
Aug. 4, 1972 Germany............................ 2238519

[52] U.S. Cl................................ 99/485; 426/631; 99/348
[51] Int. Cl.² ............................................ A23G 1/02
[58] Field of Search ............ 99/483, 485, 348, 646; 426/520, 474, 475, 481, 482, 631

[56] References Cited
UNITED STATES PATENTS

| | | | |
|---|---|---|---|
| 2,070,558 | 2/1937 | Beck | 426/520 |
| 2,348,473 | 5/1944 | Hollstein | 426/475 |
| 2,374,425 | 4/1945 | Weerth | 99/348 |
| 2,441,861 | 5/1948 | Widen | 426/475 |
| 2,520,807 | 8/1950 | Marco | 426/482 |

*Primary Examiner*—Robert W. Jenkins
*Attorney, Agent, or Firm*—Wolfgang G. Fasse; I. A. Strombeck

[57] ABSTRACT

A roasted cocoa mass or blend is produced in a continuous process by crushing raw cocoa beans after dehulling to form a more or less liquid mass which is moved as a thin layer over and in contact with a smooth roasting surface heated to between 110°C and 150°C under atmospheric or reduced pressure. The thin layer liquid cocoa mass is moved over said roasting surface for not more than 12 minutes and preferably for a shorter time, whereupon it is rapidly cooled, preferably also in a thin layer form, to 80°C or less. The smooth surface is preferably the inner surface of a hollow cylinder, especially of a so called thin layer vaporizer. Prior and preferably also during the roasting the cocoa mass is subjected to a degassification in a flow of air or water vapor, preferably a countercurrent flow. The first degassing takes place at a temperature of 95°C at the most and at a reduced pressure of 0.5 kg/cm² at the most. A homogenizing step may precede the roasting step. The so produced blend is then mixed with the other components of a chocolate recipe, whereby said other components are preferably comminuted to fine form, preferably final fine form, and the mixture is then, if necessary, comminuted and homogenized in a concurrent gas flow to form the finished chocolate mass.

1 Claim, 2 Drawing Figures

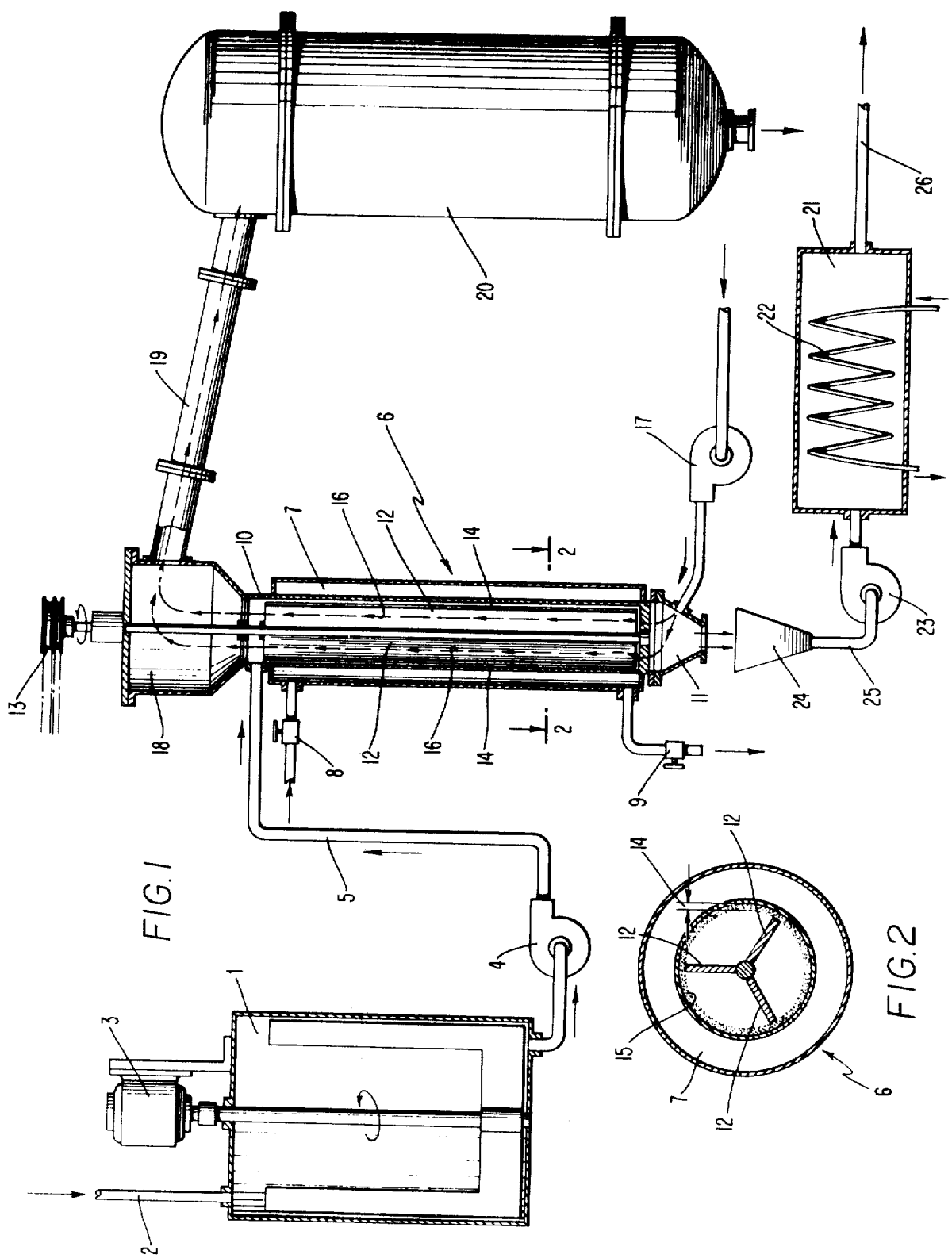

PROCESS FOR CONTINUOUSLY PRODUCING A ROASTED COCOA MASS AND FOR MANUFACTURING A CHOCOLATE MASS

This is a divisional of application Ser. No. 311,664, filed Dec. 4, 1972, now Pat. No. 3,904,777, issued Sept. 9, 1975, which in turn is a continuation-in-part of Ser. No. 120,596, filed Mar. 3, 1971, and now abandoned.

BACKGROUND OF THE INVENTION:

The present invention relates to a process for continuously producing roasted cocoa masses or liquor by removing the shells from the raw cocoa beans and crushing the dehulled beans, if desired after a preceding drying and/or fracturing step, in order to produce a more or less thin, liquid cocoa mass and roasting such liquid cocoa mass under atmospheric or reduced pressure while moving the cocoa mass and heating it to a maximum temperature of about 150°C through indirect heat transfer by means of heating surface.

Conventionally, whole or merely roughly fractured cocoa beans are used almost exclusively for the so called roasting of cocoa, that is, the cocoa beans are heated for a certain length of time to temperatures of up to about 150°C although it has been recognized long ago that in these roasting processes, including the so called fractured bean roasting, over and/or under roasting cannot be avoided due to the fact that the particles to be roasted have a relatively large size or diameter which causes a temperature drop between the surface of the particles to be roasted and their inner portions. As a result, the roasting cannot be accomplished in a uniform manner. The just described problem was clearly recognized more than half a century ago, even as to its causes, for example, by German Patent 297,888 which discloses in its basic technical teaching a presumably correct suggestion for solving the above problem. German Patent 297,888 teaches to crush the dehulled raw cocoa beans to form a pulpy or liquid mass and to spread it in this form as a thin layer onto smooth moving surfaces which are heated to the roasting temperature of about 100°C to 150°C.

Further developments and modifications of the above teaching have become known in the meantime, for example according to French Patent 175,347 which suggests to perform the roasting under normal atmospheric pressure or under reduced pressure in double walled roasting chambers which are provided with stirring means. Yet another proposal has been disclosed in German Patent Publication 1,919,870 which suggests performing the roasting of the cocoa liquid while stirring it under increased above atmospheric pressure and to eject the roasted cocoa mass into a ventilated collecting chamber in order to remove undesired volatile components which resulted from the roasting or which have been liberated by the roasting.

In spite of the just outlined developments and in spite of the fact that the roasting methods which are employed to this day in the industrial practice have basic disadvantages, especially that of an uneven roasting result, the teaching disclosed by said German Patent 297,888; namely to roast the cocoa in the form of crushed, raw cocoa beans having a pulpy or liquid cocoa mass consistency, has not found any substantial practical application either in its originally disclosed form nor in any of the subsequent modifications or developments. In fact, as far as applicants know, such teaching has not even been accepted to a limited extent in the present day practice. This fact shows clearly and surprisingly, that the problems which occur in the roasting of cocoa with regard to the uniformity and quality of the roasted product, can not be solved solely by the means disclosed in the above discussed three patents.

The roasting of the raw cocoa beans and the so called conching of the chocolate mass play a substantial roll in the production of chocolate, especially with regard to the quality of the end product as far as its aroma and its taste characteristics are concerned. The conching is a rather time-consuming process which, as a rule, requires between about 12 and 78 hours. Further, the conching cannot be performed on a continuous basis. Therefore, the chocolate industry has been searching for some time now and with substantial efforts and expenditure for possibilities which would permit to either substantially reduce the conching or to avoid it altogether. For example, in connection with the above mentioned German Patent Publication 1,919,870 it was believed that the just mentioned problem of shortening or eliminating the conching could be solved by way of a special roasting of the cocoa in a manner which basically has been known for a long time. However, as mentioned above with reference to German Patent 297,888 and with reference to French Patent 715,347 the prior art has so far not been successful in eliminating or reducing the required conching. This applies also with regard to the German Patent Publication 1,919,870 since experiments have in the meantime shown that the resulting products still require some conching where high quality chocolate is to be obtained.

OBJECTS OF THE INVENTION

In view of the foregoing the invention aims at achieving the following objects singly or in combination:

To overcome the outlined drawbacks of the prior art, especially to provide uniformly roasted cocoa product, which may be produced in a continuous process rather than in batches as heretofore;

to produce a cocoa product having high flavor and aroma qualities;

to provide a cocoa roasting process which assures practically the complete removal already during the roasting and prior thereto of volatile components which are harmful to the flavor and/or aroma of the roasted product, for example, acetic acid;

to precisely limit the duration of the roasting and stop the roasting process instantaneously upon its completion in order to prevent after roasting effects which have been disregarded heretofore;

to avoid the use of a ventilated collection chamber connected to the output of the roasting chamber;

to provide a cooling immediately after the completion of the roasting in order to stop the roasting so that it may not continue beyond a predetermined time limitation;

to provide a counter-current gas flow for the removal of volatile harmful components prior and/or during the roasting;

to provide a uniformly heated smooth roasting surface to which the liquid cocoa mass may be applied to a thin layer of substantially uniform thickness;

to assure a uniform temperature distribution throughout the thin layer so that temperature drops and thus different roasting characteristics are avoided;

to complete the uniform roasting in a continuous single passage of the cocoa mass in contact with the roasting surface so that repeated passages are avoided, preferably to complete the uniform roasting in about 0.5 to 12 minutes and preferably substantially less time;

to produce a chocolate and/or coating mass having high flavor qualities and better physical characteristics than heretofore;

to employ homogenizing before and/or after the roasting step; and to improve the prior art roasting and conching methods in such a manner that conching may be substantially reduced or eliminated altogether, whereby chocolate products are to be obtained, the quality of which corresponds to those which have been subjected to conching for a substantial length of time.

SUMMARY OF THE INVENTION

It has been found that the above outlined drawbacks of known roasting processes can be avoided and a uniformly roasted cocoa mass with high flavor qualities, meaning aroma and taste qualities, can be produced by applying the liquid raw cocoa mass in a thin layer to the heated surfaces of a roasting chamber and simultaneously removing the volatile substances which are produced during the roasting or which are liberated by the roasting and which adversely affect the flavor qualities, for example acetic acid. The removal of the flavor reducing substances should begin before the roasting and should be substantially complete already during the roasting. Further, the cocoa mass or liquid as it emerges from the roasting chamber must be instantaneously and as quickly as possible cooled to a temperature of 80°C or lower, whereby the occurrence of after roasting effects is avoided. It has been found that such after roasting effects, which heretofore have been disregarded, have an extraordinarily strong and disadvantageous influence on the roasting result.

According to the invention there is provided a method as described above in which the liquid cocoa mass is continuously applied in a thin layer onto a smooth heating surface for the roasting, which surface is maintained at a temperature range between about 100°C and 140°C, preferably at 115°C to 130°C, and wherein the cocoa mass which is being removed from the heating surface is instantaneously and quickly cooled down to a temperature of 80°C at the most. The roasting temperature within the above range will be selected in accordance with the desired degree of roasting and the provenience of the cocoa beans.

According to the invention there is further provided a process for producing a chocolate mass suitable for molding or coating purposes especially for quality chocolate products by comminuting dehulled, if desired, predried, fractured raw cocoa beans to a liquid raw cocoa mass which is capable of being pumped, whereby the liquid mass may be homogenized if desired. The raw cocoa mass is roasted by heating to a temperature in the range of about 100°C to about 150°C. Volatile undesirable components occurring or liberated during the roasting are removed and the so treated cocoa mass is mixed with other components of the respective chocolate mass recipe, preferably in finely and especially final comminuted form, if desired the mixture may also be subjected to a fine rolling step, whereupon the mixture is homogenized and if necessary conched. Either the cocoa beans or the fractured cocoa beans in the form of the liquid raw cocoa mass or in relatively coarse comminuted form is degassed prior to the roasting under reduced pressure of about 0.5kg/cm$^2$ at a temperature of about 95°C at the most. The degassed product, if necessary after further comminution to a liquid or cocoa mass and if further desired after a homogenizing step is roasted under a pressure not exceeding atmospheric pressure while maintaining a very narrow temperature range. The cocoa mass is simultaneously with the roasting and/or subsequently thereto subjected to a second degassing step.

BRIEF FIGURE DESCRIPTION

In order that the invention may be clearly understood, it will now be described, by way of example, with reference to the accompanying drawings, wherein:

FIG. 1 illustrates an apparatus for practicing the process according to the invention; and FIG. 2 illustrates a sectional view along line 2—2 of FIG. 1.

DETAILED DESCRIPTION OF EXAMPLE EMBODIMENTS

It is not yet quite clear why the combination of steps as taught by the invention results in a chocolate product having the quality and refinement of the best conched chocolate mass without the conching step necessary heretofore. However, it has been found that the fermented raw cocoa contains certain elements or compounds which as such or in the form in which they are liberated during the roasting impair the flavor quality of the finished chocolate mass. These compounds either directly or in their liberated form after the roasting could be removed heretofore only by a prolonged conching while simultaneously assuring at least the partial removal of the aroma elements which are formed during the roasting. It has further been found that the fermented raw cocoa comprise elements which could be termed as flavor precursors which are relatively hard to volatilize and which thus are not eliminated by the degassification of the comminuted raw cocoa prior to the roasting as taught by the invention and under the conditions disclosed by the present invention. The beneficial or positive effect of the homogenizing of the liquid raw cocoa mass could be explained by the intimate intermixture of the reaction components, whereby presumably the then following roasting process is facilitated or enhanced.

It is especially suitable to perform at least one of the two degassification steps as taught by the invention in a flowing atmosphere comprising a medium which is inert with regard to the material to be roasted such as a gas or air current and/or a water vapor current which is preferably advanced in a counter-current flow relative to the material to be degassified. In this manner an especially intensive and thorough degassification may be accomplished.

It is recommended that the temperature during the degassification of the comminuted cocoa beans prior to their roasting should not exceed about 95°C and preferably it should be kept in a range of about 50°C to 90°C in order to avoid an impairing of the final product since higher temperatures might cause such impairing although the degassification becomes more intensive with increasing temperatures. It is assumed that the impairing of the quality of the final product which might result from the application of too high temperatures is due to the fact that at such temperatures roasting reactions might occur whereby the relatively unvolatile flavor precursors of the cocoa are transformed into flavor elements which are relatively easily volatile whereby these precursors are then necessarily removed during the degassification at least partially. On the other hand, relatively easily volatile undesirable flavor and/or odor components or their preliminary stages are transformed at too high temperatures into relatively unvolatile components, for example, by polymerization or polycondensation. These transformed relatively unvolatile components are then unremovable under the applicable conditions and the flavor quality of the end product is influenced in a disadvantageous manner.

In order to achieve an especially thoroughly degassification prior to the roasting, it is recommendable to perform such preliminary degassification at a reduced pressure in the range of about 5 to 100 torr and especially in the range of 10 to 60 torr. It has been found that under these reduced pressure conditions a desirably thorough degassification is achieved already with relatively low temperatures.

In order to achieve an especially intensive heat and component exchange the process according to the invention teaches to degassify and/or roast the comminuted cocoa beans or the liquid raw cocoa mass preferably in a thin layer or in a so called whirling layer whereby the heat is applied to the thin layer preferably by indirect heat exchange at a heating surface to bring the cocoa to the desired temperature and to maintain it at that temperature.

The degassified liquid raw cocoa mass is roasted in the process according to the invention preferably at a roasting temperature ranging from about 100°C to 140°C and preferably from 115°C to 130°C whereby it has been found that for each type of cocoa an optimal roasting temperature has to be ascertained empirically. Thus, it has been found that an optimal flavor development is achieved in connection with the so called flavor types of cocoa as a rule at the lower end of the roasting temperature range proposed by the invention. Further, as is known by those skilled in the art, it is desirable to keep temperature variations of the roasting temperature within small limits, specifically with regard to the invention it has been found that variations exceeding ±/-1.5°C should be avoided.

The roasting time or duration as compared to the roasting temperature is of secondary importance. However, here again the conditions should be maintained as precisely as possible in order to achieve with certainty a result free of faults. The roasting time or duration according to the invention is within the range of 0.5 to 12 minutes. Frequently, the most advantageous results are achieved with roasting durations of about 2 to 6 minutes. A certain roasting time may be kept exactly and in an especially simple manner if the liquid raw cocoa mass is roasted on a conveyor belt drier or on a roller or drum drier. In order to keep an exact roasting time and to avoid after roasting effects a preferred embodiment according to the invention involves the rapid cooling of the roasted cocoa mass. Suitably, the cooling takes place rapidly to a temperature of about 80°C. This is preferably accomplished in that the liquid cocoa mass which is being removed from the roasting apparatus is instantly applied in a thin layer to a cooling surface.

The cocoa mass which has been degassified and roasted according to the invention is intermixed in any suitable conventional manner with the remaining components of the respective chocolate mass recipe. If desired, the mass may be comminuted to the desired final fineness, for example, by rolling whereafter a homogenization is accomplished preferably by the application of large shearing forces. As a surprising result of the invention, the conventionally required final conching has been completely or at least substantially avoided even in connection with the production of quality chocolate.

The final homogenization of the chocolate mass achieves essentially two effects. On the one hand junction surfaces in the mass are activated by the influence of shearing forces whereby aroma reactions occur. On the other hand the mass is liquified whereby the liquid fat phase is converted to a continuous phase. Heretofore, the same effect has been achieved by the so called conching. However, only as the result of a substantially higher investment of time. Further, it was necessary heretofore to remove through the conching undesirable components which has become unnecessary according to the method of the invention for the reasons set forth above. The homogenizing step as employed according to the invention instead of the conching requires substantially less time than the conching. It will be appreciated that a complete or partial replacement of the conching by the homogenization as taught by the invention has become possible due to the preliminary process steps as taught by the invention according to which undesirable components are removed in these preliminary steps and thus their removal during the final treatment has been obviated. This is considered to be another advantage of the invention.

The homogenization may be performed by pressing the mass to be homogenized which has been made ameanable to pumping, through one or several narrow gaps or slots. A homogenization may also be accomplished by subjecting the mass to supersonic frequencies or moving it between surfaces having a high relative speed therebetween.

The homogenization of chocolate masses of the non-Newtonian types which comprise essentially liquid fat components and a solid component or phase such as sugar and cocoa elements as well as milk powder if desired may be accomplished especially by means of devices in which the mass is introduced between surfaces having high relative speeds.

Homogenization devices in which the mass to be homogenized is pressed through narrow slots, have the tendancy to clog. Devices operating with ultrasonic frequencies might occassionally not be entirely satisfactory due to the damping of the ultrasonic frequencies by the highly viscous mass. However, these devices are all suitable to achieve satisfactory results, especially if as taught by the invention the treatment of the mass in the homogenizing device is combined with exposing the mass to a gaseous current flowing in the same direction as the movement of the mass. Such current may comprise nitrogen or air for example. The raw cocoa beans are separated in a conventional manner from stones, dust, and other contaminating material such as wood chips. Thereafter the raw cocoa beans are fractured in a breaker which also provides a winnowing to separate the hulls from the nibs. Thereafter the germ roots are removed if desired. The thus prepared fractured cocoa material is then supplied to a grinder of mill for example a cutting mill which comminutes the cocoa material to a grain size of about 2 mm. The comminuted or granular material is then spread at a pressure of about 30 torr onto surfaces which are heated to about 80°C whereby the granular material is dehydrated and simultaneously subjected to the first degassing step to remove substantially all volatile components. In this step according to the invention a substantial quantity of water is removed as well as acetic acid and a number of components or materials which have been formed during the fermentation and which do not contribute to the specific cocoa flavor.

The degassed granular material is then brought into a homogenizing device which may comprise a so called premilling apparatus, wherein it is liquified and a ball mill in which the cocoa mass is further milled down to a grain size of about 20 μm. In this connection it is suggested to carefully avoid temperatures above 80°C in order to prevent the starting of any uncontrollable roasting process.

The cocoa mass which has been prepared and homogenized as described above is then supplied into a thin layer vaporizer where it is roasted at atmospheric pressure and at a temperature of 130°C during a roasting time ranging from 1 to 2 minutes whereby the typical flavors specific to cocoa are developed. The details of the thin layer vaporizer are shown in FIG. 1 and will be described below. During the roasting the gases are removed together with other easily volatilized components which are also formed during the roasting. The removal is accomplished by a counter-current flow through the thin layer vaporizer, for example a flow of air introduced into the thin layer vaporizer.

The roasted cocoa mass leaving the thin layer vaporizer is guided over cooled surfaces in a thin layer so that it is cooled down within 0.5 to 1 minute to a temperature below 80°C whereupon it is supplied to a mixer-kneader where is is mixed with sugar having the desired final grain size or powder consistency as well as with milk powder and any other components of the particular recipe, especially cocoa butter, lecithin, spices and so on. Following a kneading time of about 20 minutes the chocolate mass is further homogenized in a device preferably under the influence of nitrogen. The cocoa mass is subjected, for example, to high shearing forces which cause the homogenization.

A chocolate produced as described above especially if it is free of milk has in addition to the better sensory quality as compared to conventionally produced chocolates, the following analytical features.

Table 1

|  | Test Chocolates (Invention) | Conventional Chocolates |
| --- | --- | --- |
| Water Content | 0.2 to 0.4% by weight | 0.4 to 0.6% by weight |
| Casson-Viscosity | 18 to 20 poise | 20 to 23 poise |

Table 1-continued

|  | Test Chocolates (Invention) | Conventional Chocolates |
| --- | --- | --- |
| Casson-Yield Value | 130 to 150 dyn/cm$^2$ | 150 to 170 dyn/cm$^2$ |

The above Table 1 shows that the chocolates according to the invention also have better physical characteristics than conventionally produced chocolates. In this connection it is especially remarkable that the chocolates according to the invention have a better melting characteristic when being eaten.

The following Table 2 may serve as an example for the effects which result if deviation from the above process steps occur in the several process stages. Table 2 uses as a basis of comparison the water content and the gas chromatographic head space analysis. With regard to said analysis it is known from the respective literature that the content of isopentanal in the cocoa mass decreases with an increase in the duration of the roasting time and in the roasting temperature. Incidentally, isopentanal is an easily volatilized aldehyde. Thus, the isopentanal content can within certain limitations serve as a guide substance for the roasting process. Due to the employed testing methods only the cocoa masses have been analytically tested and the results are shown in the following Table 2.

Table 2

| Type of Test Sample | Isopentanal Peak Surface in % of the Total Peak Surface | Water Content % by Weight |
| --- | --- | --- |
| 1. raw cocoa mass | 24.6 | 4.9 |
| 2. conventionally treated | 22.8 | 3.7 |
| 3. roasted without drying and degassing | 12.6 | 3.1 |
| 4. degassed at atmospheric pressure and then roasted | 14.2 | 2.0 |
| 5. prepared according to the invention | 7.1 | 1.5 |

It may be clearly seen from Table 2 that any deviation from the process according to the invention results in an increase of the percent by weight water content as well as in an increase in the peak surface of isopentanal in percent of the total peak surface. The tests were performed by codified sensoric comparison of the cocoa masses as well as of the chocolates prepared from these cocoa masses, whereby the results of Table 2 have been confirmed.

Similar results have been achieved if deviation from the roasting conditions as taught by the present invention occur. These roasting conditions vary with the type of cocoa used and may be exemplified in table 3 as follows.

TABLE 3

| Origin of Cocoa (Type) | Average Roasting Temperature |
| --- | --- |
| Ghana | 130°C (of the heating medium) |
| Arriba | 125°C (of the heating medium) |
| Venezuela | 120°C (of the heating medium) |

The following Table 4 illustrates the influence resulting from deviations from the optimal roasting temperature for a Ghana cocoa mass.

TABLE 4

| Roasting Temperature of Test Sample | Isopentanal Peak Surface in % of Total Peak Surface | Water Content % by weight |
|---|---|---|
| 125°C | 10.0 | 1.7 |
| 130°C | 8.8 | 1.5 |
| 135°C | 9.7 | 1.5 |
| 140°C | 15.7 | 1.3 |

It should be noted with regard to Table 4 that the increase in isopentanal for temperatures above 135°C seems to indicate that the heating to a too high degree causes a decomposition of of flavor components and the formation of isopentanal. It has been found that the optimum of the flavor formation is located at the minimum of the isopentanal curve.

It should be emphasized here that the process according to the invention permits a continuous chocolate production whereby the means for performing the individual steps of the continuous production are well known in the art. Heretofore, it was not possible to produce chocolate masses of high taste quality in a continuous process because the conching cannot be performed on a continuous basis.

Referring now to FIG. 1, the cocoa beans are supplied to a crusher 1, for example through a conduit 2. The crusher 1 is driven by a motor 3. The liquid cocoa mass is pumped by a pump 4 through a conduit 5 into the roasting chamber 6 which according to the invention is of the thin layer vaporizer type. The thin layer vaporizer 6 comprises a hollow cylinder 7 which may have a double walled outer shell through which is pumped a heating medium, preferably under the control of valves 8 and 9.

Preferably the thin layer vaporizer 6 is maintained in an upright position so that the liquid cocoa mass may be introduced at its upper end 10, whereby it will flow down along the inner surface of the vaporizer 6 toward an exit end 11. In order to continuously spread the liquid cocoa mass onto the inner surface of the vaporizer 6 there is provided a blade means 12 which is rotated, for example, through a pulley 13 by drive means not shown.

By dimensioning the rotational diameter of the blade means 12 relative to the inner diameter of the vaporizer 6 a gap 14 is provided as shown in FIG. 2. The width of the gap 14 will determine the thickness of the thin cocoa mass layer 15 as it flows down along the inner surface of the vaporizer 6.

In order to remove said harmful components which are produced during or liberated by the roasting, the invention provides a gaseous counter-current flow 16 which, for example, may be air or water vapor which is pumped by a pump 17 upwardly through the vaporizer 6 and through an upper closure member 18 as well as a conduit 19 into a condenser 20.

Another important feature of the invention is the cooling chamber 21 provided with, for example, cooling coils 22 through which a cooling medium such as water having a temperature of 80°C at the most is circulated. The roasted cocoa mass is moved instantaneously into the chamber 21 by a pump 23 which interconnects, for example by means of a funnel 24 and a conduit 25 the outlet end 11 of the chamber 6 with the chamber 21 from which the cooled cocoa mass is discharged at the output end 26. Preferably, the cocoa mass is also applied to cooling surfaces in a thin layer. For this purpose, the cooling chamber 21 may be of similar construction as the roasting chamber, however, with different temperature controls.

Flat cooling surfaces, for example, may also be attached directly to the output end 11 so that the cocoa mass may flow over these flat surfaces by gravity.

The invention is distinguished from the prior art by the specific combination of features, namely roasting of a thin layer liquid cocoa mass while simultaneously removing harmful substances and then instantaneously cooling the roasted product, whereby advantages are achieved in the form of a uniformly roasted product as well as in the form of substantial time savings because the roasting time according to the invention may now be limited to 12 minutes at the most and preferably 1 minute. Moreover, surprisingly the invention departs from the teaching of the most recent prior art as represented by German Patent Publication 1,919,870 in that the invention embarks upon a process exactly contrary to that disclosed by the just mentioned German Patent Publication. In this prior art the roasting takes place under pressure, whereby the removal of volatile substances which are harmful to flavor and aroma must necessarily and intentionally be removed subsequently to the roasting in a ventilated collecting chamber which follows the roasting chamber. Contrary thereto, the present invention accomplishes said removal of the harmful substances directly in the roasting chamber and also in the preliminary degassing step. This has the advantage that the ventilated collecting chamber has been obviated and, which is even more important, it makes the instantaneous efficient cooling possible which according to the invention prevents after roasting effects as it stops the roasting instantaneously upon the exit of the roasted cocoa mass from the roasting chamber. Moreover, the present roasting takes place under atmospheric or reduced pressure conditions, whereby the removal of substances harmful to flavor and/or aroma may be accomplished even without a counter-current gaseous flow because the low pressure conditions enhance the volatilization of such substances. However, the counter-current flow will enhance the efficiency of the just mentioned removal. As a matter of fact, an instantaneous cooling is not possible according to the method of German Patent Publication 1,919,870 because the volatilization of undesirable volatile flavor and aroma components must first be accomplished.

As mentioned above, it is suitable to provide a condensation chamber 20 wherein the volatile components which have been removed from the roasting mass in the roasting chamber 6 may be extracted from the gaseous flow by condensation.

According to the invention it is essential that the residence time of the individual cocoa mass particles in the roasting chamber 6 or rather on the roasting surface of the chamber 6 is as uniform as possible, whereby preferably an average residence time or roasting time of about 5 minutes should not be exceeded. This may easily be accomplished by respectively dimensioning the length of the roasting cylinder and by controlling the liquidity or flowability of the cocoa mass so that it will flow faster or slower along the inner surface. In this connection it has been found that a very exact control of the residence or roasting time within a precisely defined range, especially in the preferred range of 1 to 5 minutes, may be accomplished by the use of thin layer vaporizers, roller driers, or drum driers in which the roasting temperature is also easily and precisely controllable within the desired range of 120°C to 150°C, whereby the entire heating surface may be maintained at the same uniform temperature without any difficulties.

A uniform temperature distribution throughout the entire thin layer cocoa mass is accomplished by maintaining according to the invention the layer thickness within the range of 1 to 2 mm which may be done by providing a corresponding width for the gap 14 as mentioned above. This feature of the invention has the particular advantage that no special steps need to be taken for providing a continuous mixing of the cocoa mass while; nevertheless, avoiding temperature differences or keeping any such differences so small in different portions of the cocoa mass being roasted according to the present method that different roasting intensities do not occur.

The cooling which according to the invention follows instantaneously upon the roasting step and which quickly cools the roasted cocoa mass to 80°C at the most or preferably there below, is suitably accomplished by an indirect heat exchange on cooling surfaces provided in the chamber 6 over which the roasted cocoa mass is moved, preferably also in a thin layer or layers.

Yet another advantage of the present invention is seen in the fact that the roasting or residence time may be controlled within a very precise and relatively short time interval, whereby the further advantage is accomplished that the uniform roasting may be completed in a single, continuous passage of the cocoa mass through the roasting chamber. The prolonged so called conching required by the prior art is reduced or eliminated due to the degassing as taught by the invention, especially where two degassing steps are employed.

Although the invention has been described with reference to specific examples, it is to be understood, that it is intended to cover all modifications and equivalents within the scope of the appended claims.

What is claimed is:

1. In an apparatus for continuously producing a roasted cocoa composition, wherein the shells of raw cocoa beans are removed prior to crushing the beans into a relatively liquid cocoa mass, whereupon the liquid cocoa mass is roasted under pressure, the upper limit of which is atmospheric pressure, by means of indirect heat application for heating the cocoa mass to a maximum of 150°C, the improvement comprising a first substantially upright hollow cylinder, a second substantially upright hollow cylinder, means for supporting said second cylinder coaxially inside said first cylinder, separate inlet and outlet means for said first cylinder for flowing a heating medium through said first cylinder to heat the second cylinder on its outer surface, further separate inlet means at the top of said second cylinder for feeding said liquid cocoa mass into said second cylinder at the top thereof, whereby to apply the liquid cocoa mass to the inner surface of said second cylinder for gravitational downflow of the liquid cocoa mass along said inner surface of the second cylinder, revolving blade means supported in the second cylinder for thinly spreading the liquid cocoa mass onto the inner cylinder surface of the second cylinder, further separate outlet means for removing roasted cocoa mass from said second cylinder at the lower end thereof, cooling means connected to said further outlet means for instantly contacting the roasted cocoa mass with a cooling temperature, the upper limit of which is 80°C, third inlet means connected to the lower end of said second cylinder for admitting thereto an upwardly flowing gas or vapor stream which intimately contacts said thin layer downwardly flowing cocoa mass while it is being roasted and third outlet means connected to the top of said second cylinder for removing said gas or vapor stream from said second cylinder.

* * * * *